United States Patent
Otter et al.

(10) Patent No.: US 10,340,512 B2
(45) Date of Patent: Jul. 2, 2019

(54) COMPOSITE MADE OF POROUS CARBON AND SULFER-CONTAINING ACTIVE MATERIAL AS WELL AS METHOD FOR PRODUCING SAME

(71) Applicant: Heraeus Quarzglas GmbH & Co. KG, Hanau (DE)

(72) Inventors: Matthias Otter, Münster (DE); Jörg Becker, Niddatal (DE); Sascha Pihan, Aschaffenburg (DE); Christian Neumann, Hungen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 15/602,952

(22) Filed: May 23, 2017

(65) Prior Publication Data

US 2017/0263924 A1    Sep. 14, 2017

Related U.S. Application Data

(62) Division of application No. 14/435,430, filed as application No. PCT/EP2013/070902 on Oct. 8, 2013, now abandoned.

(30) Foreign Application Priority Data

Oct. 11, 2012   (DE) .......................... 10 2012 109 720

(51) Int. Cl.
*H01M 4/36* (2006.01)
*H01M 4/58* (2010.01)
(Continued)

(52) U.S. Cl.
CPC ......... *H01M 4/364* (2013.01); *H01M 4/0471* (2013.01); *H01M 4/36* (2013.01);
(Continued)

(58) Field of Classification Search
CPC .... H01M 4/625; H01M 4/5815; H01M 4/362; C01B 32/00
(Continued)

(56) References Cited

U.S. PATENT DOCUMENTS

2009/0311604 A1*  12/2009  Nazar ................... H01M 4/364
                                                         429/231.8
2011/0052998 A1     3/2011  Liang et al.
(Continued)

FOREIGN PATENT DOCUMENTS

CN         101986443 A        3/2011
DE    10 2010 005 954 A1      7/2011
(Continued)

OTHER PUBLICATIONS

Espacenet English Language Abstract for DE 10 2011 016 468, published Feb. 23, 2012.
(Continued)

*Primary Examiner* — Tri V Nguyen
(74) *Attorney, Agent, or Firm* — Tiajoloff & Kelly LLP

(57) ABSTRACT

The invention relates to a composite made of a porous carbon and an active material containing sulphur and to method for producing same. A method for producing a composite made of a porous carbon structure and sulphur is disclosed, said composite being characterized by a high capacitance and a low capacitance loss, when used as an electrode material for a lithium-sulphur secondary battery. According to the invention, a dispersion of carbon powder, an active material containing sulphur and an aqueous medium are treated hydrothermally at a temperature sufficient for melting sulphur. The liquid phase which forms, which contains the melted sulphur and water, infiltrates the pores of the porous carbon.

17 Claims, 4 Drawing Sheets

(51) Int. Cl.
*C01B 32/00* (2017.01)
*H01M 4/04* (2006.01)
*H01M 4/583* (2010.01)
*H01M 4/62* (2006.01)
*H01M 4/02* (2006.01)
*H01M 10/052* (2010.01)

(52) U.S. Cl.
CPC ......... *H01M 4/583* (2013.01); *H01M 4/5815* (2013.01); *H01M 4/625* (2013.01); *H01M 10/052* (2013.01); *H01M 2004/021* (2013.01)

(58) Field of Classification Search
USPC .......... 252/500, 506, 182.1; 423/445 R, 460; 429/231.8
See application file for complete search history.

(56) References Cited

U.S. PATENT DOCUMENTS

| | | | |
|---|---|---|---|
| 2012/0301387 A1 | 11/2012 | Neumann | |
| 2013/0224594 A1* | 8/2013 | Yushin | H01M 4/38 429/218.1 |
| 2013/0330619 A1* | 12/2013 | Archer | H01M 4/136 429/213 |
| 2014/0037528 A1 | 2/2014 | Neumann et al. | |
| 2014/0045072 A1 | 2/2014 | Neumann et al. | |
| 2014/0057179 A1 | 2/2014 | Yushin | |
| 2015/0303454 A1 | 10/2015 | Otter et al. | |

FOREIGN PATENT DOCUMENTS

| | | |
|---|---|---|
| DE | 10 2011 016 468 B3 | 2/2012 |
| DE | 10 2011 014 875 B3 | 4/2012 |
| DE | 10 2011 013 075 A1 | 9/2012 |
| WO | 2012/064702 A2 | 5/2012 |
| WO | 2014/056884 A1 | 4/2014 |

OTHER PUBLICATIONS

Espacenet English Language Abstract for DE 10 2011 013 075, published Sep. 6, 2012.
Xiulei Ji, Kyu Tae Lee, Linda F. Nazar. "A highly ordered nanostructured carbon-sulphur cathode for lithium-sulphur batteries". Nature Materials 8, 500-506 (2009), online May 17, 2009.
Mumin Rao et al., "Porous carbon-sulfur composite cathode for lithium/sulfur cells", published on Jan. 12, 2012 in Electrochemistry Communications 17 (2012), pp. 1-5.
Ryong Ryoo et al., "Ordered Mesoporous Carbons", published in Adv. Mater. 2001, 13 (9), pp. 677-681, May 3, 2001.
Espacenet English Language Abstract for CN101986443 A, published Mar. 16, 2011.
Wohlgemuth "A one-pot hydrothermal synthesis of sulfur and nitrogen doped carbon aerogels with enhanced electrocatalytic activity in the oxygen reduction reaction", Green Chem., 2012, 14, 1515-1523, Apr. 3, 2012.
Ji, "A highly ordered nanostructured carbon-sulphur cathode for lithium-sulphur batteries" Nature Materials, vol. 8, 500-506, May 17, 2009.
Liang, "Hierarchically Structured Sulfur/Carbon Nanocomposite Material for High-Energy Lithium Battery", Chemistry of Materials, 21, 4724-4730, 2009.
Zhang, "Confining Sulfur in Double-Shelled Hollow Carbon Spheres for Lithium-Sulfur Batteries", Angew. Chem. Int. Ed. 2012, 51, 9592-9595, published Aug. 17, 2012.
Zheng, "Hollow Carbon Nanofiber-Encapsulated Sulfur Cathodes for High Specific Capacity Rechargeable Lithium Batteries", NanoLetters 11, 4462-4467, pub. Sep. 14, 2011.

* cited by examiner

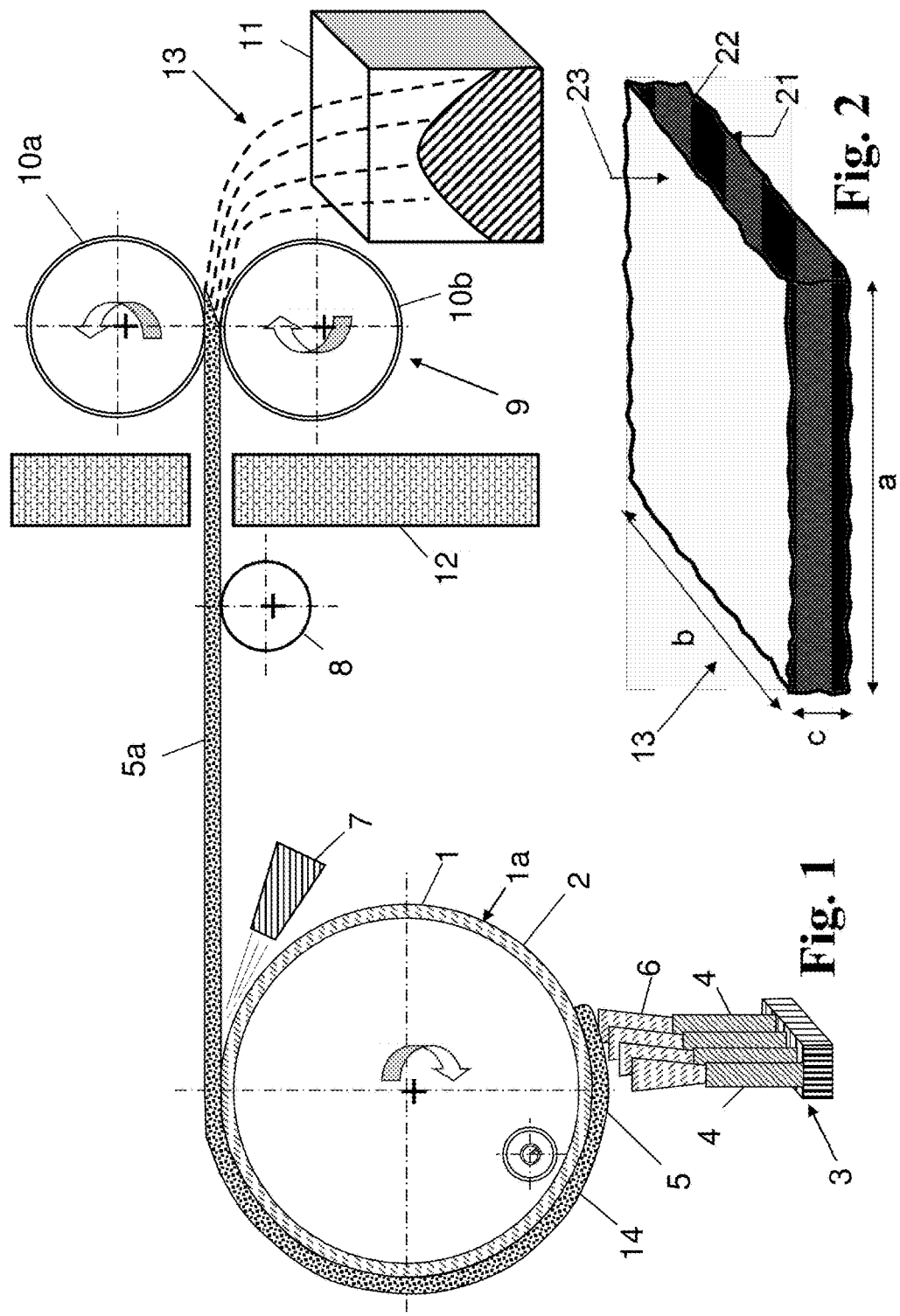

COMPOSITE MADE OF POROUS CARBON AND SULFER-CONTAINING ACTIVE MATERIAL AS WELL AS METHOD FOR PRODUCING SAME

RELATED APPLICATIONS

The present application is a divisional application of U.S. patent application Ser. No. 14/435,430 with a U.S. filing date of Apr. 13, 2015, which was published as U.S. published application no. 2015/0303454 A1, which is herein incorporated by reference, and which was a U.S. national stage of international application serial no. PCT/EP2013/070902 filed Oct. 8, 2013, and published as WO2014/056884 A1, which is herein incorporated by reference.

The present invention refers to a composite made of porous carbon and sulfur-containing active material, the composite having a porous carbon structure which comprises an outer surface and interconnected cavities which are accessible via pore channels from the outer surface and which are defined by inner walls.

Furthermore, the present invention refers to a method for producing such a composite consisting of porous carbon and sulfur-containing active material.

In the course of the development of mobile energy storage devices the demand for rechargeable batteries ("accumulators" or secondary batteries") is increasing. A basic demand is here a high gravimetric energy density. Especially for commercial applications the electrode materials should be inexpensive, non-toxic, non-explosive and easy to process.

PRIOR ART

Lithium secondary batteries are wide-spread. In these batteries a cathode (positive electrode) and an anode (negative electrode) are provided consisting of a material which is suited for the insertion and removal (intercalation and deintercalation) of lithium ions, and which adjoins an electrolyte which allows the movement of the lithium ions. As anode material, carbon structures are used that can reversibly incorporate and release lithium ions without the structural and electrical properties thereof being changed to a considerable extent. The cathode of the lithium secondary batteries consists mainly of complex oxide of lithium and a transition metal, such as lithium cobalt oxide ($LiCoO_2$). The theoretical cell voltage is about 3.7 V and the energy density with high efficiency (around 90%) is in the range of 120-210 Wh/kg, depending on the type. The theoretical maximum capacity is limited to about 300 mAh/g.

Lithium-sulfur secondary batteries are in the development phase and are regarded as one of the most promising secondary batteries of the next generation. In their simplest configuration the cell consists of a positive electrode of sulfur and of a negative electrode of lithium. The theoretical capacity is 1,650 mAh per g sulfur (on the assumption that all of the sulfur atoms are completely reduced to S2—upon discharge of an electrode); the rated voltage is 2.2 V/cell, and in theory it has one of the highest energy densities of all accumulators at all, namely about 2500 Wh/kg. The efficiency which has so far been achievable in practice is however much lower.

The component sulfur which is involved in the reaction (or sulfur-containing organic compounds) acts as an electrical insulator, so that the progress of an electrochemical reaction requires a permanent intimate contact with an electrically highly conductive component, such as carbon.

To ensure the ionic conduction of the sulfur-containing electrode, liquid electrolytes, often polar organic solvents, are used. These serve not only as ion transport media between anode and cathode, but also as ion conductors within the sulfur-containing electrode. This poses, on the one hand, the problem that the electrode structure is to allow an unhindered access of the electrolyte. On the other hand, sulfide and polysulfide discharge products, such as $Li_2S_2$ or $Li_2S$, can dissolve in the electrolyte and can be discharged thereby. This is particularly the case whenever large reservoirs of the electrolyte are available. The sulfur components diffused away from the positive electrode are no longer available for the further electrochemical reaction, whereby the charging capacity is decreasing. It is also possible that discharge products are irreversibly precipitated out of the electrolyte solution, whereby the charging capacity is also decreasing.

To mitigate these disadvantageous effects, US 2009/0311604 A1 suggests that the diffusion of the sulfur loading out of the cathode should be minimized by provision of a porous carbon matrix with nanopores as the framework material for the cathode, the sulfur loading being absorbed in the nanopores. The nanoporosity may make up between 10% and 99% of the electrode material, the sulfur loading not completely filling the pore volume so as to leave vacant a partial volume for the ingress/egress of a liquid electrolyte.

Sulfur melt is infiltrated into the nanopores of the carbon matrix. The pores are interconnected via nanochannels which can limit the mobility of the incorporated sulfur and of sulfur lithium compounds which dissolve in the electrolyte during discharge. These thereby remain in the direct vicinity of the carbon matrix and thus in contact with the electric conductor, so that the reversal of the electrochemical reaction is made possible through said conductor during the charging of the accumulator. Aerogels, xerogels and molecular sieves are named as suitable start components for the carbon matrix.

A further development of this method is known from a publication by Xiulei Ji, Kyu Tae Lee, Linda F. Nazar, "A highly ordered nanostructured carbon-sulphur cathode for lithium-sulphur batteries" in Nature Materials 8, 500-506 (2009). A mesoporous carbon product which is known under the name "CMK-3" and which has an ordered pore structure of a uniform pore size and a large pore volume is here used as the carbon matrix. This carbon product is produced by means of a so-called "hard template method". SBA-15" (derived from: "Santa Barbara Amorphous type material" (University of California)) is used as the hard template, a silica product with periodic and adjustable arrangement of mesopores and a very high specific surface area. An ordered carbon structure is thereby obtained; in this structure, carbon nanotubes which extend in parallel and in hexagonal arrangement and have a thickness of 6.5 nm are separated from one another via channels having a width of 3-4 nm. The carbon nanotubes are interconnected by means of carbon microfibers spanning the channels, whereby the structure is prevented from collapsing. This carbon structure is infiltrated with molten sulfur, the sulfur being imbibed by capillary forces into the channels and forming, after cooling, sulfur nanofibers with diameters of around 3 nm, which are in intimate contact with the carbon structure.

A similar method for producing carbon-sulfur composite powder is also described in the paper "Porous carbon-sulfur composite cathode for lithium/sulfur cells" by Mumin Rao et al., published on Jan. 12, 2012 in: Electrochemistry Communications 17 (2012), pages 1-5. A water-soluble sulfur-containing compound is dissolved in water and the solution is mixed with carbon powder. A precipitate is produced by dropwise titration in formic acid, the precipitate containing carbon particles in combination with precipitated sulfur nanoparticels. This solid is cleaned and dried. Subsequently, it is heated to 160° C. under an Ar gas stream for 12 h. The sulfur thereby becomes liquid so that it better penetrates into the micropores of the carbon particles, and superfluous sulfur is to evaporate from the outer surfaces of the carbon particles at the same time. The sulfur amount is reduced from 69.8% by wt. to 53.7% by wt. due to this thermal treatment.

Porous carbon structures produced by means of template methods in disordered and ordered form as well as methods for the production thereof are also described in DE 10 2011 013 075 and in the paper "Ordered Mesoporous Carbons" by Ryong Ryoo et al., published in Adv. Mater. 2001, 13 (9), pp. 677-681.

Technical Object

The method is complicated and expensive. Moreover, it has been found that the melt infiltration of sulfur into a matrix of porous carbon considerably depends on the surface polarity of the carbon used and that repelling interactions between the rather hydrophilic carbon and the hydrophobic sulfur melt impede infiltration.

An aggravating factor is that the property of molten sulfur shows the tendency to polymerization. Polymers tend to clog the narrow pore channels and thus the access to the pores and thereby lead to occupation-free dead volumes within the pores.

Thus one obtains—by means of the known methods—a carbon structure with inhomogeneous sulfur loading in which the concentration of the sulfur on the surfaces that are easily accessible from the outside is much higher than on the surfaces on the inner wall of the pores.

To achieve a high charging capacity of the sulfur electrode, this therefore requires not only the provision of a carbon structure with optimal pore distribution, i.e. one that is as hierarchical as possible, but also an optimal distribution of the sulfur in the pores.

Moreover, polysulfides occur in the sulfur electrode during the charging process; these are soluble in the electrolyte, which aggravates retention within the porous carbon electrode structure.

It is therefore the object of the present invention to indicate a composite of a porous carbon structure and sulfur that when used as the electrode material for a lithium-sulfur secondary battery is distinguished by a high capacity and a low capacity loss.

Moreover, it is the object of the present invention to indicate a method that permits an inexpensive production of such a composite powder.

General Description of the Invention

This object is achieved according to the invention by a method which comprises the following method steps:
(a) providing powder of porous carbon,
(b) preparing a dispersion of the carbon powder, the sulfur-containing active material and an aqueous medium,
(c) hydrothermal treatment of the dispersion at a temperature sufficient for melting sulfur, with formation of a liquid phase containing sulfur melt and water, and infiltration of pores of the porous carbon with the liquid phase;
(d) removing the water and insulating the composite.

A dispersion is produced in which particulate solid is distributed as homogeneously as possible in an aqueous medium, such as water, acid or base with possible additives. The solid comprises powder of porous carbon and active material. The active material includes sulfur or a meltable sulfur compound. The dispersion is subjected to a hydrothermal treatment. This is done under pressure and at an elevated temperature in a pressure-proof container, such as an autoclave. During heating, part of the water evaporates and exerts pressure inside the container.

The presence of a liquid phase which includes an independent sulfur phase in a liquid water phase at a high temperature above 100° and at high pressure is essential for the present invention.

That is why the temperature in the hydrothermal treatment is on the one hand high enough to fuse sulfur or the sulfur compound. Sulfur is found in several modifications. In a state of thermodynamic equilibrium the minimum melting temperature is 119.6° C. (for pure β-sulfur with monoclinic crystal structure at a pressure of 0.018 mbar); in a rhombohedral crystal structure (α-sulfur) the fusion at normal pressure can already start at a lower temperature due to kinetic conditions, the literature often indicates temperature values of around 115° C. for the melting point for sulfur.

To enable water in liquid form to remain in the liquid phase, the temperature during hydrothermal treatment is on the other hand below the so-called "critical point". In a state of thermodynamic equilibrium this point is reached at a temperature of 374.12° C. and at a pressure of 221.2 MPa.

This locating of the key points of temperature and pressure of the hydrothermal treatment follows from a purely thermodynamic consideration. When kinetic aspects are taken into account, limit values differing therefrom may be obtained for temperature and pressure.

When water is heated under pressure to temperatures above 100° C., its properties will change. Under hydrothermal conditions the water molecule shows a higher nucleophilicity, which changes the addition and hydration reactions otherwise known in water chemistry. It has been found that due to the hydrothermal procedure the subcritical liquid water serves as a wetting agent by reducing the repulsion between the hydrophilic carbon surface and the hydrophobic sulfur melt. Moreover, the solubility of sulfur in the aqueous phase is considerably increased, which may be due to the fact that polysulfides are also formed apart from cyclooctasulfur.

These effects can facilitate the penetration of the liquid phase into the pores of the porous carbon structure and reduce the occurrence of clogging, which may e.g. be caused by sulfur polymer. At any rate, in comparison with the melt infiltration of the sulfur that is standard in the prior art, one achieves a much more homogeneous distribution of the sulfur-containing active material in the pores of the carbon particles.

After completion of the hydrothermal treatment one obtains a dispersion of the aqueous medium and carbon-sulfur powder particles. These are separated with the help of standard methods, resulting in a composite powder of porous carbon and active material homogeneously inserted therein in a large amount.

Hence, the method of the invention represents an inexpensive measure that permits a homogeneous infiltration of porous carbon with sulfur-containing active material and which avoids the above-described drawbacks of the known methods.

In the case of hydrothermal treatment the desired liquid phase which contains an independent sulfur phase in a liquid water phase is preferably present in an amount that is sufficient for covering the amount of porous carbon.

This ensures a uniform loading of the whole amount of porous carbon. The pressure inside the pressure vessel is automatically obtained in response to the given temperature according to the partial pressure of water.

In this respect it has also turned out to be useful when the weight ratio of aqueous medium and solid phase in the dispersion is between 0.5:1 and 3:1.

The solids content follows from the porous carbon and the active material. At a proportion of the aqueous medium of more than 3:1, segregation phenomena are more and more observed. At a proportion of the aqueous medium of less than 0.5:1 its wetting and liquefying action is disappearing, which aggravates a homogeneous filling of the pores of the carbon structure.

The duration of the hydrothermal treatment is based on the desired degree of the loading of the porous carbon with the active material and depends on the viscosity of the liquid phase, the filling amount of active material and the particle size of the carbon powder. Typically, the duration of the hydrothermal treatment is at least 180 min.

In theory, the capacitance of the composite is increasing with the weight proportion of active material, but also with the volume change associated with the active material during the discharging and charging process, as has already been explained above. The carbon matrix of the composite powder serves to create a framework or a cover and to cushion volume changes. In the case of the composite according to the invention a weight proportion of 1-90%, preferably between 50-80%, has turned out to be advantageous for the active material.

The insulation of the composite after completion of the hydrothermal treatment preferably includes a floatation step.

After completion of the hydrothermal treatment one obtains a dispersion in which possible residual sulfur is floating and can thus be removed by flotation. By contrast, the comparatively heavy composite will sink downwards.

In a particularly preferred variant of the method the provision of the carbon powder comprises a template method in which a carbon skeleton is built up around a structure-directing template of porous $SiO_2$ soot and the template material is thereupon removed.

Such a template method for producing a porous carbon product for electrodes of secondary batteries is per se known from DE 10 2010 005 954 A1. A porous $SiO_2$ template of agglomerated or aggregated $SiO_2$ nanoparticles is produced by hydrolysis or pyrolysis of a silicon-containing start compound by way of a soot deposition process. The pores are infiltrated with a carbon precursor substance. After calcination the $SiO_2$ template is removed by etching. One obtains a porous carbon product with a hierarchical pore structure, which is ideal for the implementation of the inventive method.

The finer the template particles, the faster, more efficient and uniform is the infiltration with carbon under otherwise identical process conditions. The template particles are produced for example by milling porous $SiO_2$ soot body or by crushing layers of $SiO_2$ soot, by pressing a powder of $SiO_2$ soot, or granulation methods. Preferably, the template is provided in the form of porous $SiO_2$ granulate particles with non-spherical morphology, which are obtained in that a $SiO_2$ soot layer produced by gas phase deposition is thermally consolidated into a porous soot plate and is then comminuted into the porous granulate particles.

The soot plate which is produced by soot deposition and thermally densified can be comminuted under small efforts, resulting in granulate particles with platelet-like or flake-like morphology. These are thus characterized by a non-spherical morphology which can be infiltrated with carbon in a particular homogeneous and fast manner, for the granulate particles display a great ratio of surface to volume, which simplifies and homogenizes the infiltration with a liquid substance.

In a preferred method for building up the carbon skeleton, a mixture of template particles and of particles of a meltable precursor substance for carbon is heated, so that precursor substance melt penetrates into the pores of the template particles and the precursor substance is carbonized prior to the removal of the template material.

The precursor substance for carbon is here heated in contact with the template and thereby softened or fused, so that it can penetrate into the pores of the template. A solvent for the carbon precursor substance is not needed. This "direct infiltration" of the template with liquefied precursor substance will be the most successful if previously produced powders both from the porous template material and from the precursor substance are provided, these powders are homogeneously intermixed and the homogeneous powder mixture is heated to such an extent that the particles of the precursor substance melt. This melt can directly penetrate into the neighboring template particles. The homogeneous powder mixture ensures that molten precursor substance is always in intimate contact with the template particles, resulting in a uniform distribution and occupation over the whole pore volume of the template material to be infiltrated. The high temperature during melting of the precursor substance improves the wettability of the surfaces of the template, resulting in a high filling degree of the pore volume even if infiltration is only carried out once. After carbonization the inorganic template material is removed. It just serves as a mechanically and thermally stable skeleton for depositing and calcining the carbon precursor substance.

As a rule, the carbon product is obtained in the above-described template production methods as a monolith with platelet- or flake-like morphology. The composite powder produced therefrom is preferably present in the form of porous carbon flakes of carbon layers with a mean layer thickness in the range of 10 μm to 500 μm, preferably in the range of 20 μm to 100 μm, particularly preferably of less than 50 μm; these have a hierarchical pore structure.

Layer thicknesses of less than 10 μm may lead to a small mechanical stability of the carbon particles. Carbon flakes with a thickness of more than 500 μm are more and more inhomogeneous over their thickness. The hierarchical pore structure is obtained due to the production of a $SiO_2$ soot template by gas phase deposition, which has been explained in more detail above, and it is very well suited for the production of the electrodes of rechargeable lithium-sulfur batteries.

The hydrothermal treatment brings about a much stronger loading with active material inside the pores of the porous carbon structure than outside the pores. Only the amount of the active material stored within the pores is subject to the retention capacity of the carbon structure. By contrast, the portion deposited on the outer wall can be easily transported away by the electrode and is then lost for the electrochemical process. This is particularly true for polysulfides, which are typically soluble in electrolytes.

Therefore, it is preferably provided that the amount of the active material measured in at. % on the surface within the pores of the carbon is higher at least by the factor 1.5, preferably at least by the factor 3, than the amount of the active material measured on the surface outside the pores of the carbon.

As for the composite containing carbon and sulfur, the above-mentioned object starting from a composite of the aforementioned type is achieved according to the invention in that the amount of the active material measured in at. % in the pore channels and the inner walls is higher by at least the factor 1.5 than that on the outer surface, and that in the pore channels and the inner walls the amount of the active material determined by means of EDX analysis in at. % is higher by at least the factor 1.5 than the amount of carbon determined by means of EDX analysis in at. %.

The composite according to the invention is e.g. obtained with the help of the method according to the invention. As has been explained in connection with this method, the hydrothermal treatment in the presence of a liquid phase of aqueous medium and liquid sulfur leads to a significant and homogeneous loading of the pores and pore channels of the porous carbon structure with sulfur. The loading amount is much greater than is achievable with known methods. It is only in this way that an occupation with active material, particularly with sulfur, can be achieved on the inner wall of pores and pore channels, which in case of a determination by way of EDX analysis is greater by at least the factor 1.5, preferably at least the factor 3, than the amount of carbon (in at. %) and which at the same time is greater by at least the factor 1.5, preferably by at least the factor 3, than the amount of active material on the outer surface.

The amount of active material which is deposited on the outer surface can be easily transported away by the electrolyte and is then lost for the electrochemical process. Only the amount of the active material which is stored within the pores and the pore channels is subject to the retention capacity of the carbon structure.

EMBODIMENT

The invention shall now be explained in detail with reference to an embodiment and a drawing. In detail, FIG. 1 shows an apparatus for producing $SiO_2$ granulate particles as a template material for producing porous carbon, in a schematic view;

FIG. 2 shows a platelet-like $SiO_2$ granulate particle in a schematic view;

PREPARATION OF TEMPLATE MATERIAL

Figure 3:
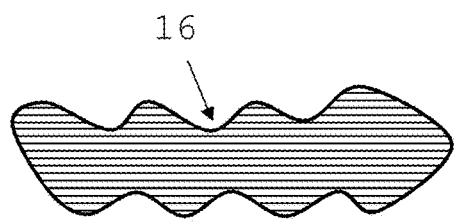
FIGS. 3 to 6 show stages of the production of a porous carbon product in a schematic view.

The apparatus shown in FIG. 1 serves to produce porous granulate particles of $SiO_2$ which are used in the method according to the invention as a hard template for producing porous carbon. This apparatus and the method for the hard template production are explained in DE 10 2011 014 875 B3; the corresponding content thereof is herewith included in the present application.

The apparatus comprises a drum 1 which is rotatable about its rotation axis 2 and which consists of a base body made of special steel, which is covered with a thin layer of silicon carbide. The drum 1 has an outer diameter of 30 cm and a width of 50 cm. A layer 5 of $SiO_2$ soot is deposited on the outer surface 1a of the drum 1 and is slightly thermally densified directly into a porous soot plate of $SiO_2$. Flame hydrolysis burners 4 are used for the soot deposition; of these burners, four are arranged in successive order in a joint burner row 3 in the direction of the longitudinal axis 2 of the drum. The burner row 3 is reciprocated in parallel with the rotation axis 2 between two stationary turning points. The flame hydrolysis burners 4 are fed with oxygen and hydrogen as fuel gases and with octamethylcyclotetrasiloxane (OMCTS) as feedstock material for the formation of $SiO_2$ particles. The size of the $SiO_2$ primary particles produced thereby is in the nanometer range, wherein plural primary particles agglomerate in the burner flame 6 and are obtained in the form of more or less spherical aggregates with a specific BET surface area in the range of 25 $m^2/g$, which form a continuous, uniformly thick $SiO_2$ soot layer 5 on the outer surface 1a of the drum.

On their way to the deposition surface, the primary particles agglomerate into nanoparticles. Depending on the degree of the interaction with the reaction zone on their way to the deposition surface, different numbers of primary particles agglomerate, resulting in principle in a wide particle size distribution of the nanoparticles in the range of about 5 nm to about 200 nm. The nanoparticles are interconnected via so-called sinter necks. Large cavities or pores are obtained between the individual nanoparticles; in the soot layer and in sub-pieces thereof, these form a system of interconnected macropores. A certain thermal consolidation of the soot layer is desired, so that a porous coherent skeleton is formed in which spherical nanoparticles are aggregated or agglomerated into larger units and are interconnected via so-called "sinter necks".

The rotation speed of the drum 1 and the deposition rate of the flame hydrolysis burners 4 are matched such that one obtains a $SiO_2$ soot layer 5 with a width of about 40 cm and a thickness of about 45 μm (the soot layer is drawn in FIG. 1 with an exaggerated thickness for reasons of illustration). The burners 4 simultaneously effect a certain pre-sintering of the soot layer 5 into a soot plate 5a by producing a mean temperature of about 1200° C. on the surface of the topmost soot layer. The pre-sintering process is supported by a tubular infrared radiator 14 which is arranged within the drum 1, which is formed as a hollow drum, in the left lower quadrant, and which heats the outer surface of the drum 1 from the inside shortly after the application of the soot layer 5.

The porous and slightly pre-sintered soot plate 5a obtained in this way has a mean relative density of about 22% (based on the density of quartz glass with 2.21 $g/m^3$).

After slightly more than half a drum revolution the soot plate 5a passes into the exposure area of a blower 7 by means of which a gas stream is produced that is directed against the bottom side of the soot plate 5a, so that the soot plate 5a lifts off from the outer surface 1a of the drum.

The soot plate 5a is subsequently supplied via a support roll 8 to a crushing tool 9 which consists of two counter-rotating rolls 10a, 10b between which a gap is provided having the thickness of the soot plate 5a, and the surfaces of which are provided with longitudinal profiles.

The soot plate 5a which passes through the gap is comminuted by the longitudinal profiles of the rolls 10a, 10b into fragments having about the same size (granulate particles 13), which are collected in a collection container 11. A partition wall 12 is provided between the drum 1 and the crushing tool 9; the partition wall is here provided with an opening for passing the soot plate 5a there-through and serves to shield the soot deposition process against the effects of the comminuting process.

The granulate particles 13 obtained according to the method have a platelet- or flake-like morphology and a thickness that corresponds approximately to the thickness of the soot plate 5a, i.e., about 45 μm. Due to the crushing operation described, the granulate particles 13 also have about the same size, so that a narrow grain size distribution is achieved.

For the production of the composite according to the invention such a porous template with soot structure is coated with sulfur-containing active material, wherein the inner surfaces of the pores and cavities are covered with the active material, so that the pore structure and particle distribution given in the template is more or less transferred to this coating.

FIG. 2 schematically shows such a non-spherical, platelet-like $SiO_2$ granulate particle 13 according to the invention. The granulate particle 13 has a more or less planar top side 20 and a bottom side 21 extending in parallel therewith as well as lateral fracture surfaces 22, each with open pores. The thickness dimension is designated by "c" and the two lateral dimensions by "a" and "b". The structure ratio "A", i.e. the ratio of maximum structure width (a) or (b) and thickness (c) of the granulate particles 13, is about 10 in the embodiment.

Preparation of Porous Carbon

The porous granulate particles produced in this way serve as a hard template for the preparation of porous, flake-like carbon powder, as is schematically shown in FIGS. 3 to 6 and will be explained in detail hereinafter.

Viewed under the microscope, the non-spherical plate-like template particles 13 are composed of a multitude of spherical aggregates of $SiO_2$ primary particles which are interconnected and thereby form a "soot skeleton". A single primary particle aggregate 16 of that type is schematically shown in FIG. 3, which thus shows a cutout of a "soot skeleton".

The granulate particles 16 are homogeneously intermixed by means of a mixer with finely ground powder of mesophase pitch in the volume ratio 1:1 (pitch:granulate particles). The mixing period is about 5 min.

The particle mixture is subsequently heated to a temperature of 300° C. The low-viscosity pitch envelopes the small $SiO_2$ primary-particle aggregate 16 and penetrates into and infiltrates the pores. The volume ratio of pitch and primary-particle aggregate is here chosen such that the pitch fills the pores to such an extent that a significant free pore volume is hardly left after an infiltration period of 30 min.

Figure 4:
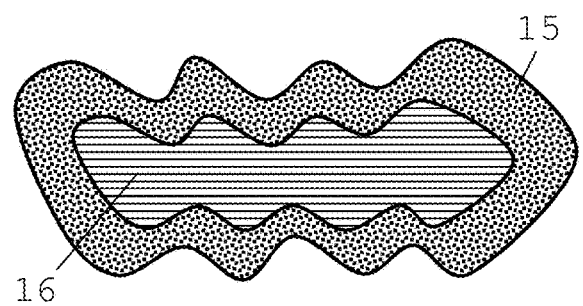

FIG. 4 schematically shows the composite of primary-particle aggregate 16 obtained thereby, which is surrounded by a pitch layer 16.

Figure 5:
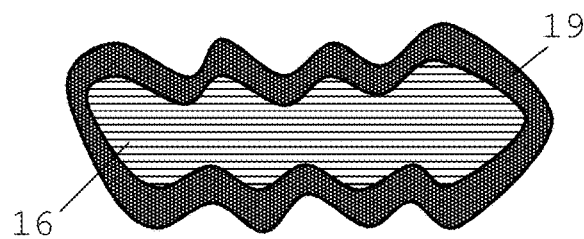

After an infiltration period of 30 min the temperature is increased to 700° C. under nitrogen and the pitch of the composite layer is reduced to carbon (carbonized). The original pitch layer is shrinking in this process and thereafter forms a graphite-like carbon layer 19 with a slightly smaller thickness than is schematically shown in FIG. 5.

The carbon layer 19 has a low porosity and it has a thickness of about 50 nm on average. In this connection it should be noted that the illustration of FIGS. 3 to 6 is not true to scale.

After cooling one obtains a slightly porous composite mass consisting of non-spherical porous primary-particle aggregates 16 which are everywhere covered with a layer consisting of graphitizable carbon.

The $SiO_2$ of the primary-particle aggregate 16 is subsequently removed in that the composite mass is introduced into a bath consisting of 2-molar NaOH solution. Since the template particles consist of nanoparticles which are interconnected in net-like fashion, the NaOH solution can advance within the network structure until the whole template material is removed.

Figure 6:
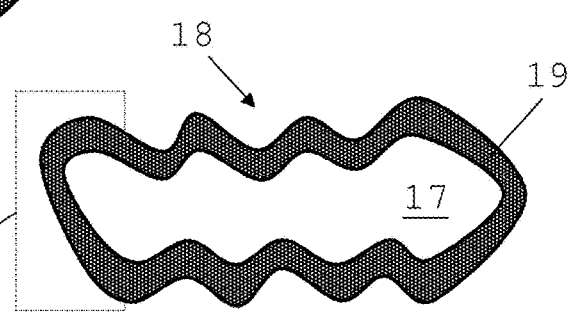

FIG. 6 schematically shows the porous carbon structure 18 obtained after the $SiO_2$ primary-particle aggregate 16 has been etched away. Due to the removal of the template material the volume that was previously occupied by spherical nanoparticles and their aggregates/agglomerates forms cavities 17 which are interconnected via pore channels—these are the former sinter necks. The carbon structure 18 consists of a thin graphite-like carbon layer 19 which forms the wall of a cavity 19 originally occupied by a $SiO_2$ nanoparticle agglomerate, i.e. by a primary-particle aggregate 16.

The carbon structure 18 extends in all spatial directions and approximately forms a negative imprint of the mass distribution of the original $SiO_2$ primary-particle aggregates 16. It has a hierarchical pore structure. It is important that the cavity 17 is not self-contained, but is fluidically connected to other mesopores and macropores. It provides a free pore volume and further surface through which an active material fixed to or in the carbon structure can be accessed by an electrolyte.

In case of need the composite structure 18 obtained thereby is further crushed. This yields carbon flakes in the case of which relatively large cavities pass in the form of channels through a finely rugged surface.

The preparation method is the subject of DE 10 2011 013 075 A1; its content is herewith included in the present application.

Loading of the Porous Carbon Structure with Active Material

The carbon flakes of porous carbon produced thereby with a hierarchical pore structure are particularly well suited for the production of electrode layers of the sulfur electrode (cathode) of a rechargeable lithium-sulfur battery. To this end the carbon flakes are infiltrated with sulfur with the help of a hydrothermal method.

As start components, use is made of (A) porous carbon flakes with lateral dimensions which are distinguished by a mean thickness of 50 μm at a structure ratio of 5. These have a porosity, as explained with reference to FIG. 6.

(B) Powder of pure sulfur in a rhombohedral modification with a particle size of less than 200 μm.

(C) Deionized water with a conductivity of less than 3 μS.

These components are used with the following formulation:

Formulation 1:

| | |
|---|---|
| Carbon flakes | 200 g |
| Sulfur powder | 160 g |
| Water | 150 g |

These two solid components (A) and (B) are intermixed in a dry state and homogeneously dispersed with deionized water; the solids content of the dispersion is 70% by wt. It is introduced into a Teflon-coated autoclave and subjected therein to the following procedure:

Procedure 1:

| Heating-up rate | 10° C./min |
|---|---|
| End temperature | 140° C. |
| Holding period | 360 min at the end temperature |

The end temperature of the hydrothermal treatment is here chosen such that it is adequate for fusing the sulfur, but is below the critical point of water. It forms a liquid phase which contains sulfur melt and subcritical water and just covers the amount of carbon flakes. The liquid phase penetrates the pores of the carbon flakes under high pressure, so that these are loaded with sulfur.

Under the hydrothermal treatment the solubility of sulfur in the aqueous phase is raised and the water displays an additional action as a wetting agent by reducing the repulsion between the hydrophilic carbon surface and the hydrophobic sulfur melt. The risk of clogging of the narrow pore channels which interconnect relatively large cavities (pores) found in the porous carbon structure is thereby reduced.

The start amount of sulfur is chosen such that it is taken up as completely as possible in the pores of the carbon structure, so that the amount of residual sulfur is as small as possible after the hydrothermal treatment.

In the dispersion resulting after completion of the hydrothermal treatment, the floating sulfur is removed by flotation and the remaining solids content which contains the carbon-sulfur composite is filtered off.

Figure 7:
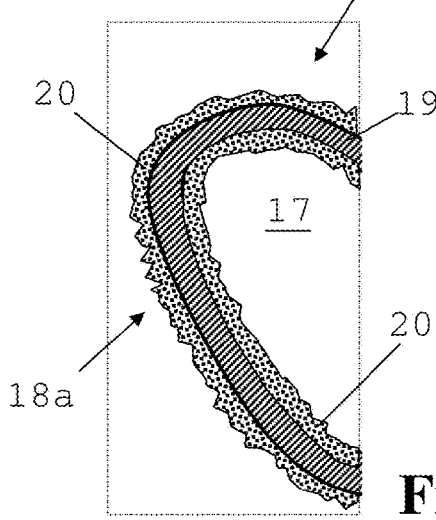
FIG. 7 shows the section A of the carbon product according to FIG. 6 on an enlarged scale after loading with active material.

One obtains a composite powder 18a of porous carbon and sulfur which is homogeneously inserted in the cavities 17 in a large amount, as schematically shown in FIG. 7. The walls of the carbon structure 19 are mainly covered by a layer 20 of sulfur, also the inner walls of the cavities 17.

By comparison with the melt infiltration of the sulfur which is standard in the prior art, this degree of covering leads to a distribution of the sulfur in the pores of the composite powder 18a that is much more homogeneous.

Due to the insertion of the sulfur in the cavities 17, the sulfur compounds which are formed during discharge of the battery and released are physically bound, whereby it is prevented that they are uniformly distributed in the electrolyte and are thus no longer available for the electrochemical reaction.

Figure 8:
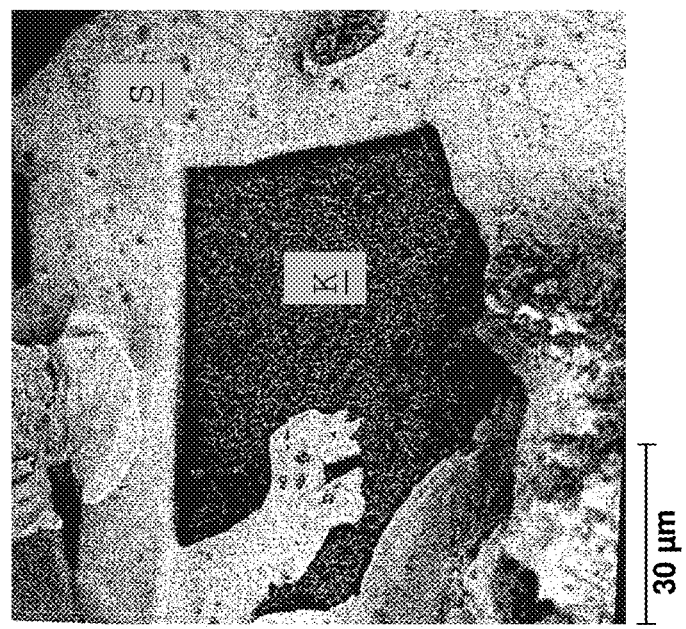
FIG. 8 shows a scanning electron micrograph of a composite produced according to the invention and consisting of carbon and sulfur.

FIG. 8 shows a scanning electron micrograph of a composite of carbon and sulfur which has been produced by melt infiltration. Areas of carbon "K" are identifiable by the dark-gray or black coloring. Areas of sulfur "S" are brightly colored. It is immediately apparent from this that the carbon areas and sulfur areas are strictly separated from one another, and that there is no intimate bonding. A large part of the sulfur S is deposited on the outside of the carbon particle C and not infiltrated into the cavities.

Figure 9:
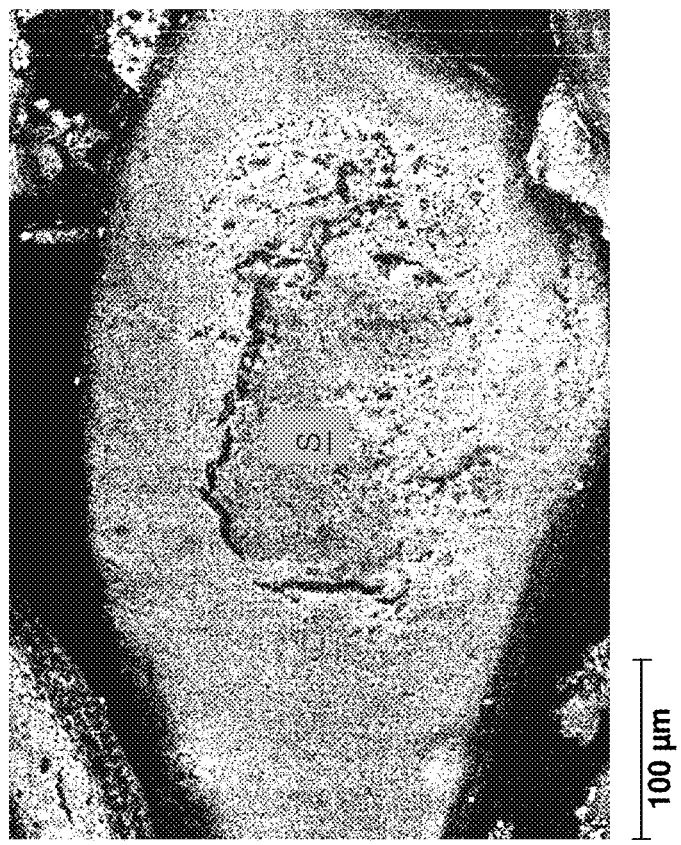
FIG. 9 shows a scanning electron micrograph of a composite produced by melt infiltration and consisting of carbon and sulfur for the purpose of comparison.

By comparison, the scanning electron micrograph of FIG. 9 shows a section of a composite produced according to the invention. Sulfur S is homogeneously distributed in the carbon matrix.

The dimensions of the composite powder conform to those of the raw material component (A). For the further characterization local element concentrations on the powder particles are determined by way of EDX analysis. For this purpose a thin surface layer of a composite powder particle was sputtered by way of a focused Ga ion beam.

Figure 10:
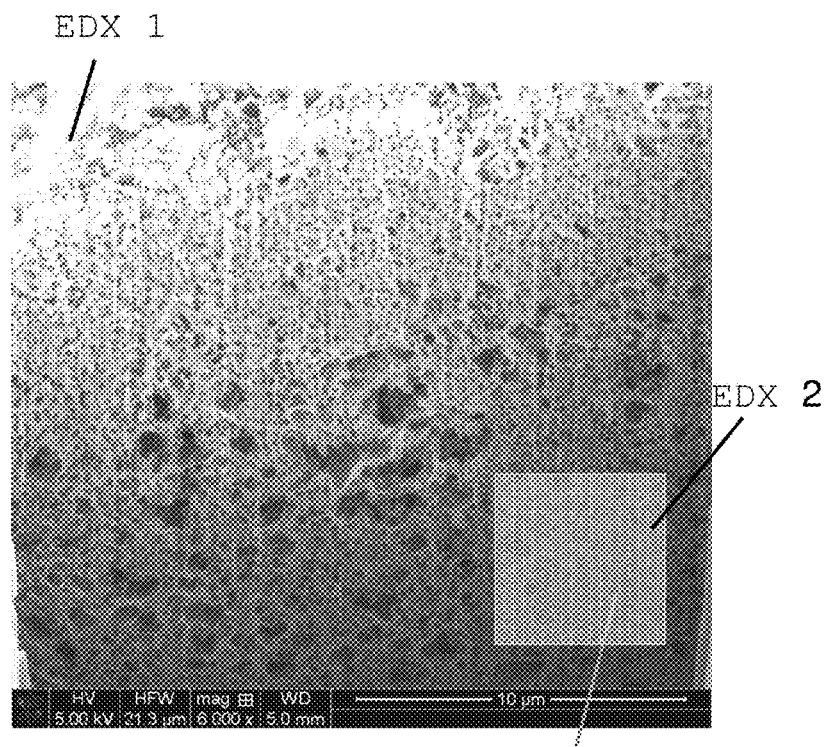
FIG. 10 shows a scanning electron micrograph of a composite according to the invention in cutting after sputtering by means of a focused ion beam.

FIG. 10 shows the corresponding cut of the composite powder particle. The original surface of the particle that has not been sputtered is visible in the left upper corner of the image as a substantially white area. The EDX analysis EDX1 has been carried out in this area.

Figure 11:
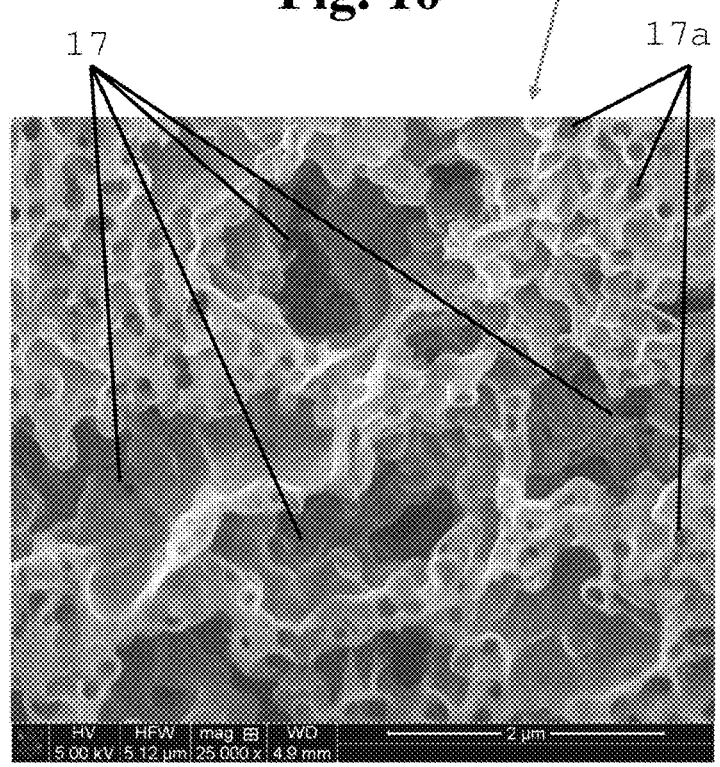
FIG. 11 shows the section marked in FIG. 10 on an enlarged scale for the purpose of explaining the measurement place for an EDX analysis.

FIG. 11 shows the portion marked in FIG. 10 on an enlarged scale. Several, relatively large cavities 17 and many fine pore channels 17a can be seen. FIG. 11 plastically shows the tortuosity of the carbon structure which achieves a high retention capacity for the active material. The EDX analysis EDX2 was carried out in this area.

Table 1 shows the result of the EDX1 analysis for the outer surface of the composite particle:

TABLE 1

| Element | wt. % | at. % |
|---|---|---|
| C | 74.08 | 89.68 |
| S | 21.05 | 9.55 |
| Ga | 1.67 | 0.35 |
| Ag | 3.19 | 0.43 |
| Total | 100.00 | 100.00 |

Table 2 shows the result of the EDX2 analysis for the inner walls in the area of the cavities 17 and pore channels 17a:

TABLE 2

| Element | wt. % | at. % |
|---|---|---|
| C | 22.76 | 45.07 |
| S | 71.35 | 52.93 |
| Ga | 5.89 | 2.01 |
| Total | 100.00 | 100.00 |

In Tables 1 and 2:
C stands for the amount of carbon,
S stands for the amount of sulfur,
Ga stands for the amount of gallium which follows as impurity due to the previous sputtering with the Ga ion beam, and
Ag stands for the amount of silver which is contained in the conductive paste for fixing the composite particle.

The comparison shows that the sulfur content in the area of the inner wall of the composite powder particle is higher by more than three times than on its outside. Moreover, it follows from Table 2 that on the inner wall of the cavities 17 and pore channels 17a the sulfur content is more than three times higher than the carbon content, which points at an almost complete and dense occupation of the carbon walls.

The invention claimed is:
1. A method for producing a composite consisting of porous carbon and sulfur-containing active material, said method comprising:
(a) providing a carbon powder of porous carbon;
(b) preparing a dispersion of the carbon powder, the sulfur-containing active material, and an aqueous medium;
(c) performing a hydrothermal treatment of the dispersion at a temperature sufficient for melting sulfur so as to form a liquid phase containing sulfur melt and water and to cause infiltration of pores of the porous carbon with the liquid phase; and

(d) removing the water and insulating the composite; and wherein a weight ratio of a weight of the aqueous medium to a weight of solid phase in the dispersion is between 0.5:1 and 3:1;

wherein the provision of the carbon powder comprises a template method in which a carbon skeleton is built up around a structure-directing template of a porous SiO2 soot template material, and the template material is thereupon removed.

2. The method according to claim 1, wherein the liquid phase is present in an amount sufficient for fully covering the porous carbon.

3. The method according to claim 1, wherein the hydrothermal treatment has a duration that is at least 180 min.

4. The method according to claim 1, wherein the sulfur-containing active material in the composite makes up a weight percentage of 1% to 90%.

5. The method according to claim 1, wherein the removal of the water and the insulation of the composite include a flotation step.

6. The method according to claim 1, wherein the structure-directing template is provided in a form of porous $SiO_2$ granulate particles with non-spherical morphology, and wherein said porous $SiO_2$ granulate particles are obtained by producing a $SiO_2$ soot layer by gas phase deposition, thermally solidifying the $SiO_2$ soot layer into a porous soot plate, and comminuting said porous soot plate into the porous $SiO_2$ granulate particles.

7. The method according to claim 1, wherein for the template method a mixture of template particles and of particles of a meltable precursor substance for carbon is heated, such that the precursor substance melts and penetrates into pores of the template material, and the precursor substance is carbonized prior to the removal of the template material.

8. The method according to claim 1, wherein the amount of the sulfur-containing active material measured in atom-% on a surface within the pores of the porous carbon is higher at least by a factor of 1.5 than the amount of the sulfur-containing active material measured on a surface outside the pores of the porous carbon.

9. The method according to claim 8, wherein the sulfur-containing active material is present on the surface within the pores in an amount determined by EDX analysis in atom-% that is higher by at least a factor of 1.5 than an amount of carbon thereon determined by EDX analysis in atom-%.

10. The method according to claim 9, wherein the sulfur-containing active material is present on the surface within the pores in an amount determined by EDX analysis in atom-% that is higher by at least a factor of 3 than an amount of carbon thereon determined by EDX analysis in atom-%.

11. The method according to claim 1, wherein the sulfur-containing active material in the composite makes up a weight percentage of 50% to 80%.

12. The method according to claim 1, wherein the amount of the sulfur-containing active material measured in atom-% on a surface within the pores of the porous carbon is higher at least by a factor of 3 than the amount of the sulfur-containing active material measured on a surface outside the pores of the porous carbon.

13. The method according to claim 12, wherein the sulfur-containing active material is present on the surface within the pores in an amount determined by EDX analysis in atom-% that is higher by at least a factor of 1.5 than an amount of carbon thereon determined by EDX analysis in atom-%.

14. The method according to claim 13, wherein the sulfur-containing active material is present on the surface within the pores in an amount determined by EDX analysis in atom-% that is higher by at least a factor of 3 than an amount of carbon thereon determined by EDX analysis in atom-%.

15. A method for producing a composite consisting of porous carbon and sulfur-containing active material, said method comprising:
(a) providing a carbon powder of porous carbon;
(b) preparing a dispersion of the carbon powder, the sulfur-containing active material, and an aqueous medium;
(c) performing a hydrothermal treatment of the dispersion at a temperature sufficient for melting sulfur so as to form a liquid phase containing sulfur melt and water, and to cause infiltration of pores of the porous carbon with the liquid phase; and
(d) removing the water and insulating the composite; and wherein a weight ratio of a weight of the aqueous medium to a weight of solid phase in the dispersion is between 0.5:1 and 3:1; and
wherein the composite is present in the form of porous carbon flakes of carbon layers having a mean layer thickness ranging from 10 µm to 500 µm and has a hierarchical pore structure.

16. A method for producing a composite consisting of porous carbon and sulfur-containing active material, said method comprising:
(a) providing a carbon powder of porous carbon;
(b) preparing a dispersion of the carbon powder, the sulfur-containing active material, and an aqueous medium;
(c) performing a hydrothermal treatment of the dispersion at a temperature sufficient for melting sulfur so as to form a liquid phase containing sulfur melt and water, and to cause infiltration of pores of the porous carbon with the liquid phase; and
(d) removing the water and insulating the composite; and wherein a weight ratio of a weight of the aqueous medium to a weight of solid phase in the dispersion is between 0.5:1 and 3:1; and
wherein the composite is present in the form of porous carbon flakes of carbon layers having a mean layer thickness ranging from 20 µm to 100 µm and has a hierarchical pore structure.

17. The method according to claim 16, wherein the mean layer thickness of the carbon layers is not less than 20 µm and less than 50 µm.

* * * * *